(12) United States Patent
DiChiara, Jr.

(10) Patent No.: US 12,498,186 B2
(45) Date of Patent: Dec. 16, 2025

(54) TRANSPIRATIONAL COOLING PANEL

(71) Applicant: The Boeing Company, Chicago, IL (US)

(72) Inventor: Robert A. DiChiara, Jr., Carlsbad, CA (US)

(73) Assignee: The Boeing Company, Arlington, VA (US)

( * ) Notice: Subject to any disclaimer, the term of this patent is extended or adjusted under 35 U.S.C. 154(b) by 336 days.

(21) Appl. No.: 17/809,812

(22) Filed: Jun. 29, 2022

(65) Prior Publication Data

US 2024/0002033 A1 Jan. 4, 2024

(51) Int. Cl.
*B32B 5/02* (2006.01)
*B32B 3/26* (2006.01)
(Continued)

(52) U.S. Cl.
CPC .............. *F28F 21/04* (2013.01); *B32B 3/266* (2013.01); *B32B 5/02* (2013.01); *B32B 5/26* (2013.01);
(Continued)

(58) Field of Classification Search
CPC ...... F28F 21/04; F28F 13/003; F28F 2265/26; B32B 3/266; B32B 5/02; B32B 5/26; B32B 7/09; B32B 37/0038; B32B 37/06; B32B 37/1018; B32B 7/12; B32B 15/14; B32B 15/18; B32B 15/20; B32B 2038/008; B32B 2260/021; B32B 2260/046; B32B 2262/101; B32B 2262/105; B32B 2264/1021; B32B 2264/1023; B32B 2307/304; B32B 2607/00; B32B 18/00; C04B 2235/3217; C04B 2235/3409; C04B 2235/3418; C04B 2235/36; C04B 2235/3826; C04B 2235/5224; C04B 2235/5228; C04B 2235/5264; C04B 2235/5445; C04B 2237/343; C04B 35/10; C04B 35/14; C04B 35/18; C04B 35/565; C04B 2235/612; C04B 2235/616; C04B 35/634; C04B 35/6365; C04B 35/80; B64G 1/58

See application file for complete search history.

(56) References Cited

U.S. PATENT DOCUMENTS 4,421,700 A * 12/1983 Patel ...................... C04B 30/02
264/118
4,868,142 A 9/1989 Waisala et al.
(Continued)

OTHER PUBLICATIONS

United States Patent and Trademark Office, Office Action Issued in U.S. Appl. No. 17/809,809, filed Aug. 16, 2023, 18 pages.
(Continued)

*Primary Examiner* — Christopher W Raimund
(74) *Attorney, Agent, or Firm* — Alleman Hall & Tuttle LLP

(57) ABSTRACT

A transpirational cooling panel comprises a porous ceramic matrix composite layer and a porous high-temperature fabric layer. A machined ceramic fiber batting is located between the porous ceramic matrix composite layer and the porous high-temperature fabric layer. A ceramic stitching joins the porous ceramic matrix composite layer and the porous high-temperature fabric layer through the machined ceramic fiber batting.

13 Claims, 10 Drawing Sheets

(51) Int. Cl.

| | | |
|---|---|---|
| *B32B 5/26* | (2006.01) | |
| *B32B 7/09* | (2019.01) | |
| *B32B 7/12* | (2006.01) | |
| *B32B 15/14* | (2006.01) | |
| *B32B 15/18* | (2006.01) | |
| *B32B 15/20* | (2006.01) | |
| *B32B 37/00* | (2006.01) | |
| *B32B 37/06* | (2006.01) | |
| *B32B 37/10* | (2006.01) | |
| *B32B 38/00* | (2006.01) | |
| *F28F 13/00* | (2006.01) | |
| *F28F 21/04* | (2006.01) | |

(52) U.S. Cl.
CPC ............ *B32B 7/09* (2019.01); *B32B 37/0038* (2013.01); *B32B 37/06* (2013.01); *B32B 37/1018* (2013.01); *F28F 13/003* (2013.01); *B32B 7/12* (2013.01); *B32B 15/14* (2013.01); *B32B 15/18* (2013.01); *B32B 15/20* (2013.01); *B32B 2038/008* (2013.01); *B32B 2260/021* (2013.01); *B32B 2260/046* (2013.01); *B32B 2262/101* (2013.01); *B32B 2262/105* (2013.01); *B32B 2264/1021* (2020.08); *B32B 2264/1023* (2020.08); *B32B 2307/304* (2013.01); *B32B 2607/00* (2013.01); *F28F 2265/26* (2013.01)

(56) References Cited

U.S. PATENT DOCUMENTS

| | | | |
|---|---|---|---|
| 5,273,821 A | 12/1993 | Olson et al. | |
| 5,439,627 A | 8/1995 | De Jager | |
| 5,626,951 A * | 5/1997 | Hogenson | B32B 5/26 |
| | | | 428/920 |
| 5,945,049 A | 8/1999 | Vandermeer | |
| 6,041,590 A | 3/2000 | Hayton et al. | |
| 6,585,842 B1 | 7/2003 | Bompard et al. | |
| 6,844,057 B2 | 1/2005 | DiChiara, Jr. | |
| 6,852,271 B1 | 2/2005 | DiChiara, Jr. | |
| 6,969,546 B2 | 11/2005 | DiChiara, Jr. | |
| 7,128,532 B2 | 10/2006 | Petervary et al. | |
| 7,232,093 B2 | 6/2007 | Behrens et al. | |
| 7,510,754 B2 | 3/2009 | DiChiara, Jr. | |
| 10,106,242 B1 | 10/2018 | Halamandaris et al. | |
| 11,174,818 B2 | 11/2021 | Norman et al. | |
| 2003/0113447 A1* | 6/2003 | Sherwood | C04B 35/565 |
| | | | 427/221 |
| 2003/0145773 A1 | 8/2003 | Barney et al. | |
| 2005/0075026 A1 | 4/2005 | DiChiara, Jr. | |
| 2006/0060702 A1 | 3/2006 | Behrens et al. | |
| 2008/0292838 A1 | 11/2008 | DiChiara, Jr. | |
| 2019/0136765 A1 | 5/2019 | Fair et al. | |

OTHER PUBLICATIONS

3M Advanced Materials Division, "3M Nextel Ceramic Fibers and Textiles Technical Reference Guide," Oct. 2021, 24 pages.
European Patent Office, Extended European Search Report Issued in Application No. 23181329.6, Oct. 26, 2023, Germany, 8 pages.
United States Patent and Trademark Office, Office Action Issued in U.S. Appl. No. 17/809,809, filed Aug. 2, 2024, 14 pages.

* cited by examiner

TRANSPIRATIONAL COOLING PANEL

FIELD

This disclosure relates to panels configured for transpirational cooling.

BACKGROUND

Various components of an object, such as a powered aircraft, are exposed to high temperatures. For example, some components of an exhaust system of the aircraft are exposed to temperatures of up to 3500° F. produced by an engine or an afterburner in powering the aircraft. Such components can include liners, decks, and edges, as examples.

For an apparatus to operate in such temperature regimes, various components of the apparatus are fabricated from material(s) suited for high temperatures. One such material is INCONEL (available from Special Metals Corporation of New Hartford, New York), a nickel-chromium alloy having a density of 8.17 g/cc (510 lbs./ft$^3$) often used for its suitability to high-temperature applications. The use of such materials, however, imparts additional weight to such components, which is challenging to accommodate in aerospace applications. Metallic heat-resistant materials also can be reflective to radar, and have a catalytic surface that is also low in emissivity, thereby not allowing material to be able to absorb and reemit heat energy to the environment lowering the surface temperature. Thus, a technical challenge exists to provide a suitable heat-resistant material that is operable in the temperature regimes produced by a powered aircraft or other vehicle.

SUMMARY

According to one aspect of the present disclosure, a transpirational cooling panel is provided. The transpirational cooling panel comprises a porous ceramic matrix composite layer and a porous high-temperature fabric layer. A machined ceramic fiber batting is located between the porous ceramic matrix composite layer and the porous high-temperature fabric layer. A ceramic stitching joins the porous ceramic matrix composite layer and the porous high-temperature fabric layer through the machined ceramic fiber batting.

According to another aspect of the present disclosure, a method is provided for manufacturing a transpirational cooling panel. The method comprises saturating one or more layers of a ceramic fiber batting with a polymer solution. The ceramic fiber batting comprising the polymer solution is compressed, and solvent is evaporated from the ceramic fiber batting to form a ceramic batting/polymer intermediate. The method further comprises machining the ceramic batting/polymer intermediate. A ceramic fabric layer is placed adjacent to the ceramic batting, and a high-temperature fabric layer is placed adjacent to the ceramic batting on an opposite side of the ceramic batting as the ceramic fabric layer. The ceramic fabric layer is stitched to the high-temperature fabric layer through the ceramic batting/polymer intermediate using a ceramic thread to form a pre-panel structure. The pre-panel structure is heated to remove the polymer from within the ceramic batting. The method further comprises forming a ceramic matrix composite skin that incorporates the ceramic fabric layer.

This simplified summary of the specification is presented to provide a basic understanding of some aspects of the specification. This summary is not an extensive overview of the specification. It is intended to neither identify key or critical elements of the specification nor delineate any particular embodiments of the specification, or any scope of the claims. Its sole purpose is to present some concepts of the specification in a simplified form as a prelude to the more detailed description that is presented in this disclosure.

The features, functions, and advantages that have been discussed can be achieved independently in various embodiments or can be combined in yet other embodiments, further details of which can be seen with reference to the following description and drawings.

DETAILED DESCRIPTION

Figure 1:
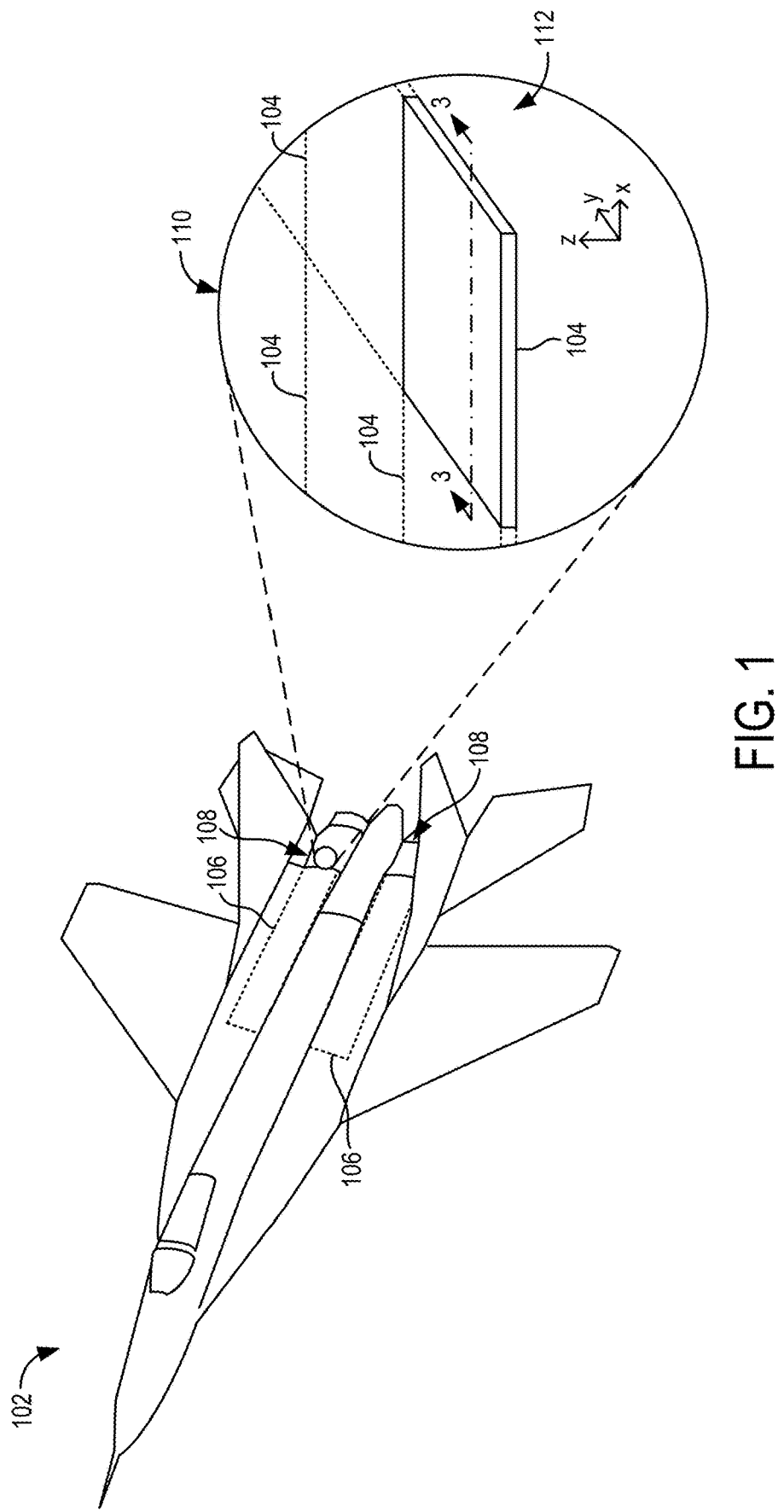
FIG. 1 shows an example of an aircraft including an example transpirational cooling panel.

As introduced above, various components of a vehicle, such as a powered aircraft, are exposed to high temperatures. In some instances, one or more components of an aircraft exhaust system can be subjected to temperatures of greater than 1500° F. produced by an engine in powering the aircraft. Such components can include liners, decks, and edges, as examples. Other objects, such as hypersonic vehicles and spacecraft, are also exposed to considerable levels of heat (e.g., during flight or reentry, not only near the engines but also over the entire outer mold line thermal protection surface).

To provide an apparatus that is operable in such temperature regimes, such as a transpirational cooling panel for an aircraft exhaust system, various components of the apparatus are fabricated from material(s) suited for high temperatures. As mentioned above, one such material is INCONEL. The use of INCONEL, however, imparts additional weight to components and unwanted reflectivity.

In some instances, ceramic composite materials have been utilized in high-temperature applications. However, when these composites are attached to the underlying structure often of different material with different thermal expansions, such materials are subject to deformation (e.g., out-of-plane deflection or bowing) caused by differential thermal expansion on the outside and on the cooler inside of both the panel and of the structure the panel is attached too. Such deformation creates mechanical stresses at the attachment points, and deformation of the surface can additionally introduce turbulence when a surface of the transpirational cooling panel is exposed to a laminar flow (e.g., in an aircraft exhaust system). Thus, a technical challenge exists to provide a suitable heat-resistant material that is operable in the temperature regimes produced by a powered aircraft or other vehicle that will not warp, deform or create high stress attachment loads to the cooler underlying structure. Many materials if heated too frequently or quickly will also warp or thermal shock and crack.

To address these issues, examples are disclosed that relate to a transpirational cooling panel comprising a porous ceramic matrix composite outer layer, a porous high-temperature fabric layer, and a machined ceramic fiber batting located between the porous ceramic matrix composite layer and the porous high-temperature fabric layer. A ceramic stitching joins the porous ceramic matrix composite layer and the porous high-temperature fabric layer through the machined ceramic fiber batting.

As described in more detail below, the transpirational cooling panel is configured to be operable at high temperatures (e.g., at local surface temperatures of up 2000° F. in an environment up to 3500° F.) and in the presence of large temperature gradients (e.g., where at least two different portions of the transpirational cooling panel differ in temperature by more than 600° F.). The ceramic stitching allows for the expansion of the ceramic matrix composite layer, the porous high-temperature fabric layer, and/or the ceramic fiber batting without distorting the surface structure of the transpirational cooling panel. In addition, the machined ceramic fiber batting provides the transpirational cooling panel with a uniform surface that avoids introducing turbulence in laminar flows parallel to the surface. The transpirational cooling panel also can be significantly lighter at 15 lbs/ft$^3$ in some examples and relatively inexpensive to manufacture compared to the use of materials such as INCONEL at 510 lbs/ft$^3$, and can be formed in a variety of shapes. The low mass, low thermal expansion, high fiber content and low modulus of the components allow for the material system to also have favorable thermal shock properties.

FIG. 1 shows an example of an apparatus, in the form of an aircraft 102, which includes an example of a transpirational cooling panel 104. The aircraft 102 comprises a heat source in the form of an engine 106 and an exhaust system 108. In other examples, the apparatus comprises any other suitable object, such as ground-based vehicle (e.g., a car or truck), a spacecraft, a watercraft, or a component thereof.

To cool the apparatus, a cooling system 110 is provided comprising the transpirational cooling panel 104. In some examples, the transpirational cooling panel is configured for use in one of an afterburner of the exhaust system 108, an engine deck, an engine edge, or an engine liner of the engine 106. In other examples, one or more aspects of the transpirational cooling panel 104 disclosed herein are implemented for applications other than transpirational cooling. Some examples of other suitable applications include, but are not limited to, insulation in a hypersonic vehicle or spacecraft. It will be appreciated that such insulation can be external insulation like TPS (Thermal Protection System) or internal insulation within an engine or an inlet. For example, the methods and apparatuses disclosed herein are also applicable in other insulating and/or cooling applications, such as blanket insulation or thermal seals.

In the example of FIG. 1, the transpirational cooling panel 104 has a planar configuration. Accordingly, in some examples the transpirational cooling panel 104 can be incorporated into a planar surface and/or tiled in a planar mosaic array 112 comprising a plurality of transpirational cooling panels 104.

Figure 2:
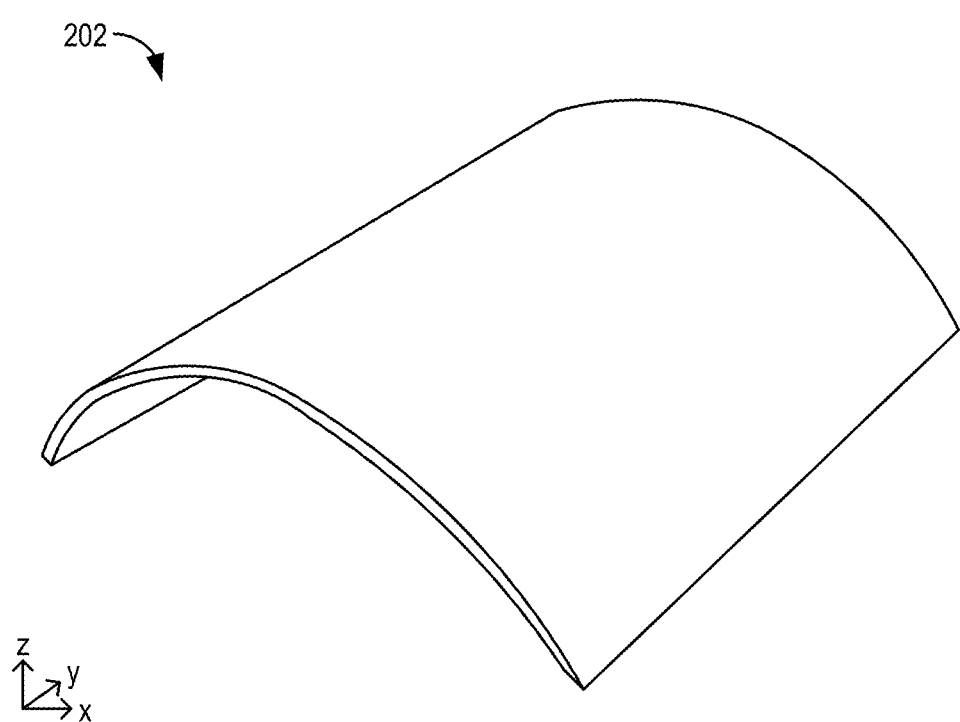
FIG. 2 shows an example of a transpirational cooling panel that can be used in the aircraft of FIG. 1.

In other examples, and as described in more detail below with reference to FIGS. 5A-5B, the transpirational cooling panel has any other suitable shape. Some examples of other suitable shapes include, but are not limited to, shapes having curved configurations. FIG. 2 shows another example of a transpirational cooling panel 202 comprising a curved configuration. The transpirational cooling panel 202 can serve as the transpirational cooling panel 104 of FIG. 1.

Figure 3:
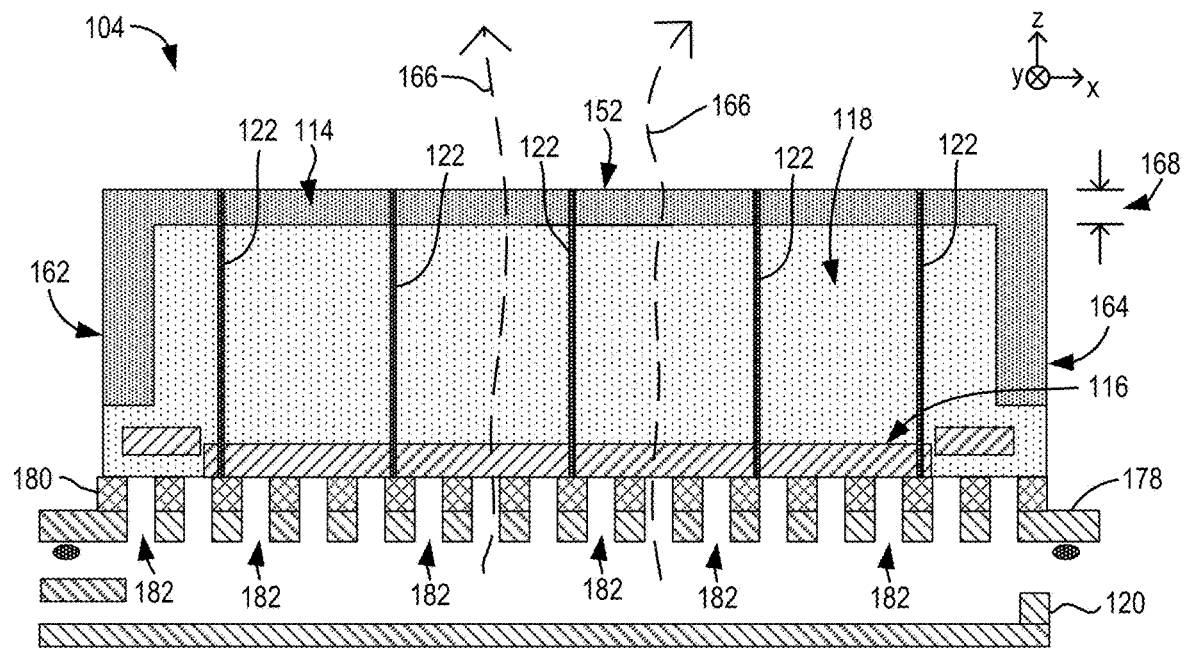
FIG. 3 shows a cross-sectional view of the transpirational cooling panel of FIG. 1.
Figure 4:
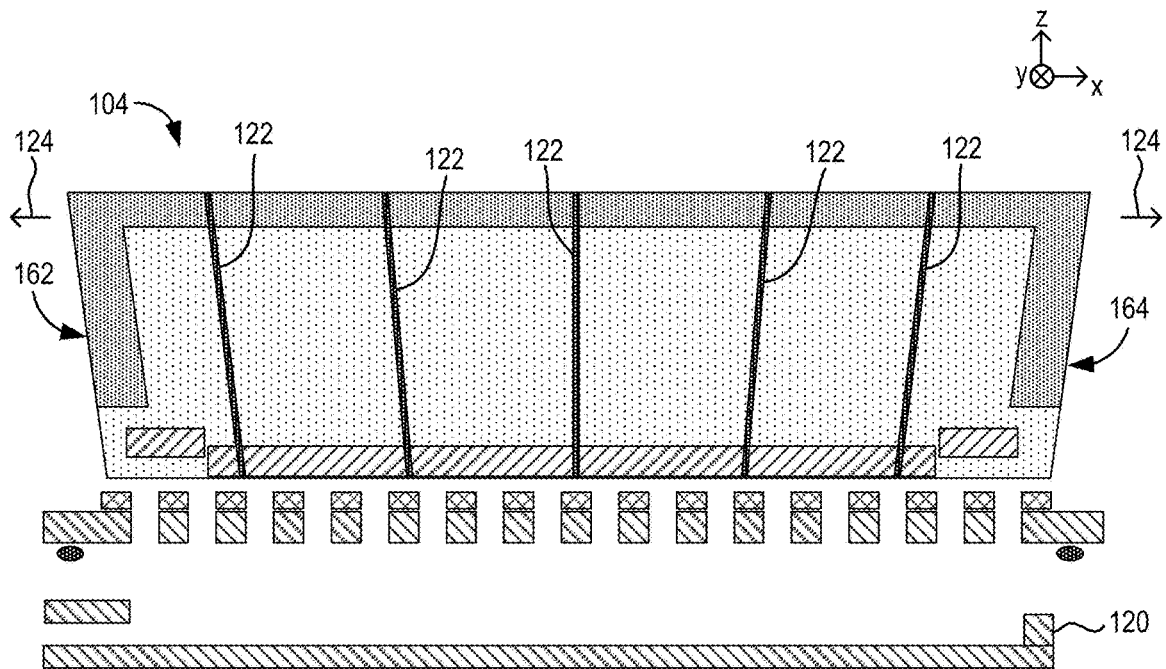
FIG. 4 shows a cross-sectional view of the transpirational cooling panel of FIG. 1 experiencing differential lateral expansion.

FIGS. 3 and 4 show a cross-sectional view of the transpirational cooling panel 104 taken along line 3-3 of FIG. 1. As described in more detail below with reference to FIGS. 5A-5B, the transpirational cooling panel 104 comprises a porous ceramic matrix composite (CMC) layer 114. In some implementations, the porous CMC layer 114 forms an outer surface (e.g., skin) of the transpirational cooling panel 104 and also serves as an interior surface of an afterburner. Accordingly, and as described in more detail below, the porous CMC layer 114 is configured to withstand high-temperature and high thermal shock conditions. In addition, the fine pores in the CMC layer 114 act as passageway for efficient cooling. Further, the ceramic materials of CMC layer 114 are not prone to catalytic surface behavior like metals such as INCONEL.

In the context of the porous CMC layer 114, the term "porous" refers to the ability of the porous CMC layer 114 to insulate materials on either side of the porous CMC layer 114, or to allow cooling air to pass through the porous CMC layer 114 and cool the transpirational cooling panel 104. As described in more detail below, the porous CMC layer 114 also has a low mass relative to anon-porous CMC material. The low mass of the porous CMC layer 114 also has a thin cross-section relative to the transpirational cooling panel 104. This enables the skin to heat and cool faster than a more massive structure.

As described herein, "high-temperature" refers to temperature regimes that can be produced by an aircraft engine or afterburner, friction or shock wave compression experienced by a vehicle during hypersonic travel, or friction or shock wave compression experienced by a spacecraft during atmospheric reentry. In some examples, one or more components of the transpirational cooling panel 104 are subjected to temperatures of up to 3,500° F. For example, the transpirational cooling panel 104 may have a surface temperature of up to 2000° F. while operating in an environment that is up to 3500° F. In other examples, one or more components of the transpirational cooling panel are subjected to temperatures in the range of 400-1800° F. In yet other examples, one or more components of the transpirational cooling panel are subjected to temperatures in the range of 600-1800° F. It will also be appreciated that such temperatures can also be experienced in other contexts, and that the methods and apparatuses disclosed herein can be implemented in other temperature ranges that are higher or lower than the temperatures disclosed herein.

With continued reference to FIG. 3, the transpirational cooling panel 104 further comprises a porous high-temperature fabric layer 116. The porous high-temperature fabric layer 116 is located opposite the porous CMC layer 114. In some examples, the porous high-temperature fabric layer 116 is adjacent to a cooling air source in the form of an engine bypass air 120. Engine bypass air has a high temperature relative to ambient conditions (e.g., 300-650° F.). However, the engine bypass air is significantly cooler than the temperatures experienced at the porous CMC layer 114 during afterburner operation, which cools the porous CMC layer 114 during operation within the high-temperature regimes described above.

It will also be appreciated that, in other examples, the transpirational cooling panel 104 is located at any other suitable location. In some such examples, the transpirational cooling panel 104 is not adjacent to the engine bypass air 120. Instead, the transpirational cooling panel 104 utilizes a cooling fluid (e.g., a liquid or a gas, such as ram air or engine bypass air) that is diverted from a cooling source, such as a ram air stream, an engine bypass stream, or an external air inlet. In other examples, the transpirational cooling panel 104 utilizes a cooling fluid that is provided via a heat exchanger (e.g., located in the engine bypass stream). Other examples of cooling sources can provide a cooling fluid that has a lower and/or more stable temperature than the engine bypass air 120.

A machined ceramic fiber batting 118 is located between the porous CMC layer 114, which has a low thermal mass relative to the remainder of the transpirational cooling panel, and the porous high-temperature fabric layer 116. As described in more detail below, and as one potential advantage of being machined, the machined ceramic fiber batting provides the transpirational cooling panel with a uniform surface that avoids introducing turbulence in laminar flows parallel to the surface.

The machined ceramic fiber batting 118 insulates the porous CMC layer 114 from the remainder of the transpirational cooling panel 104. This enables the porous CMC layer 114 to rapidly absorb and dissipate heat, which would otherwise incur additional resistance by sinking heat and increasing mass into other structures (e.g., by sinking heat through a z-axis thickness of the machined ceramic fiber batting 118). In addition, the machined alumina ceramic fiber batting 118 is 97% porous in some examples and permeable to cooling air, and the fibrous structure of the machined alumina ceramic fiber batting 118 includes very fine (e.g. approximately 3 micron) diameter alumina fiber that extend generally along the in-plane direction of the panel perpendicular to the heat flow in some examples. The fibers are surrounded by pores. When the air passes from the back surface through the pores within the batting (perpendicular to the in plane fiber direction) the relatively high surface area of the thermally conductive batting easily transfer the heat from the insulation into the flowing cooling air in the batting then out through the top porous thin CMC surface layer. Surface area can be measured following ASTM Standard No. C1069.

In some examples, the machined ceramic fiber batting 118 has a void fraction in the range of 20-99%. The void fraction is determined by dividing a void volume (which may be measured by subtracting a density of the machined ceramic fiber batting 118 (e.g., 7 lbs/ft$^3$ in some examples) from a density of fibers in the machined ceramic fiber batting 118 (e.g., alumina fibers having a density of 246.6 lbs/ft$^3$ in some examples)), by the density of the fibers. Density is mass per unit volume, which in some examples is determined in accordance with ASTM Standard No. D792. In other examples, the machined ceramic fiber batting 118 has a void fraction in the range of 60-95%. In yet other examples, the machined ceramic fiber batting 118 has a void fraction in the range of 85-98%. In some examples, the machined ceramic fiber batting 118 has a density in the range of 1-20 pounds/ft$^3$. The density of the machined ceramic fiber batting 118 is mass per unit volume, which in some examples is determined in accordance with ASTM Standard No. D792. In other examples, the machined ceramic fiber batting 118 has a density in the range of 5-15 pounds/ft$^3$. In yet other examples, machined ceramic fiber batting 118 has a density of 6-8 pounds/ft$^3$. The density of the machined ceramic fiber batting 118 enables the machined ceramic fiber batting to be sewn without damaging the ceramic fibers or stitching material. The porosity enables cooling air (e.g., bypass air) from a back side of the transpirational cooling panel to diffuse through the machined ceramic fiber batting, absorbing heat and preventing heat from migrating to an inner mold line (e.g., formed by the porous high-temperature fabric layer 116). This air exits through the finely porous structure of the porous CMC layer, cooling the porous CMC layer before exiting the porous CMC layer, where it forms a thin cooling area that serves as film cooling or a buffer between the porous CMC layer and the high-temperature environment adjacent to the transpirational cooling panel. This multilayer design allows for efficient cooling of the transpirational cooling panel.

As described in more detail below with reference to FIGS. 5A-5B, the machined ceramic fiber batting 118 is treated to be made rigid at least temporarily during panel manufacturing, which enables a precursor batting material to be machined into a variety of suitable configurations. In some examples, and as described in more detail below with reference to FIGS. 6-11, treating the precursor batting material with a cellulosic polymer solution enables compressible precursor batting materials to be handled without changing the density and/or fibrous structure of the materials, enabling the machined ceramic fiber batting to be provided in the transpirational cooling panel with a uniform density of ceramic fiber throughout, and without introducing lumps or bulges. Furthermore, the rigidity enables the machined ceramic fiber batting 118 to be stitched (e.g., with ceramic stitching 122) without distorting the structure of the machined ceramic fiber batting 118 (e.g., by creating a quilting or pillowing effect around the stitches). In this manner, the machined ceramic fiber batting 118 maintains a smooth outer surface, preventing laminar airflow adjacent to the surface from tripping and introducing turbulence that can create hot spots on the surface.

As described in more detail below, in some examples, the machined ceramic fiber batting 118 is formed from alumina (e.g., $Al_2O_3$) fibers (e.g., 3-μm-diameter fibers) batting that is provided in continuous fiber rolls having a width of 3 feet and a thickness in the range of 0.25-1.00 inch at a density of approximately 3 pounds per cubic foot. In some examples, the batting is stacked in layers that, when formed into the machined ceramic fiber batting 118, are approximately half as thick as the raw batting provided from the rolls. The layers are saturated with a low-viscosity (e.g., 10-20 cP) methylcellulose solution, compressed, and then dried and machined. This methylcellulose solution provides a uniform density fiber board with a consistent distribution of methylcellulose polymers therein, which allows the board to be easily machined.

Ceramic stitching 122 joins the porous CMC layer 114 and the porous high-temperature fabric layer 116 through the machined ceramic fiber batting 118. As illustrated in the example of FIG. 4, the ceramic stitching 122 provides strain isolation and tolerance for thermal expansion 124. In this manner, and as described in more detail below with reference to FIGS. 5A-5B, the ceramic stitching 122 prevents delamination of the porous CMC layer 114, the machined ceramic fiber batting 118, and the porous high-temperature fabric layer 116 during operation of the transpirational cooling panel 104 with large thermal gradients. The stitching also acts as strain isolation reducing thermal stress loads to the below cooled structure.

Figure 5A:
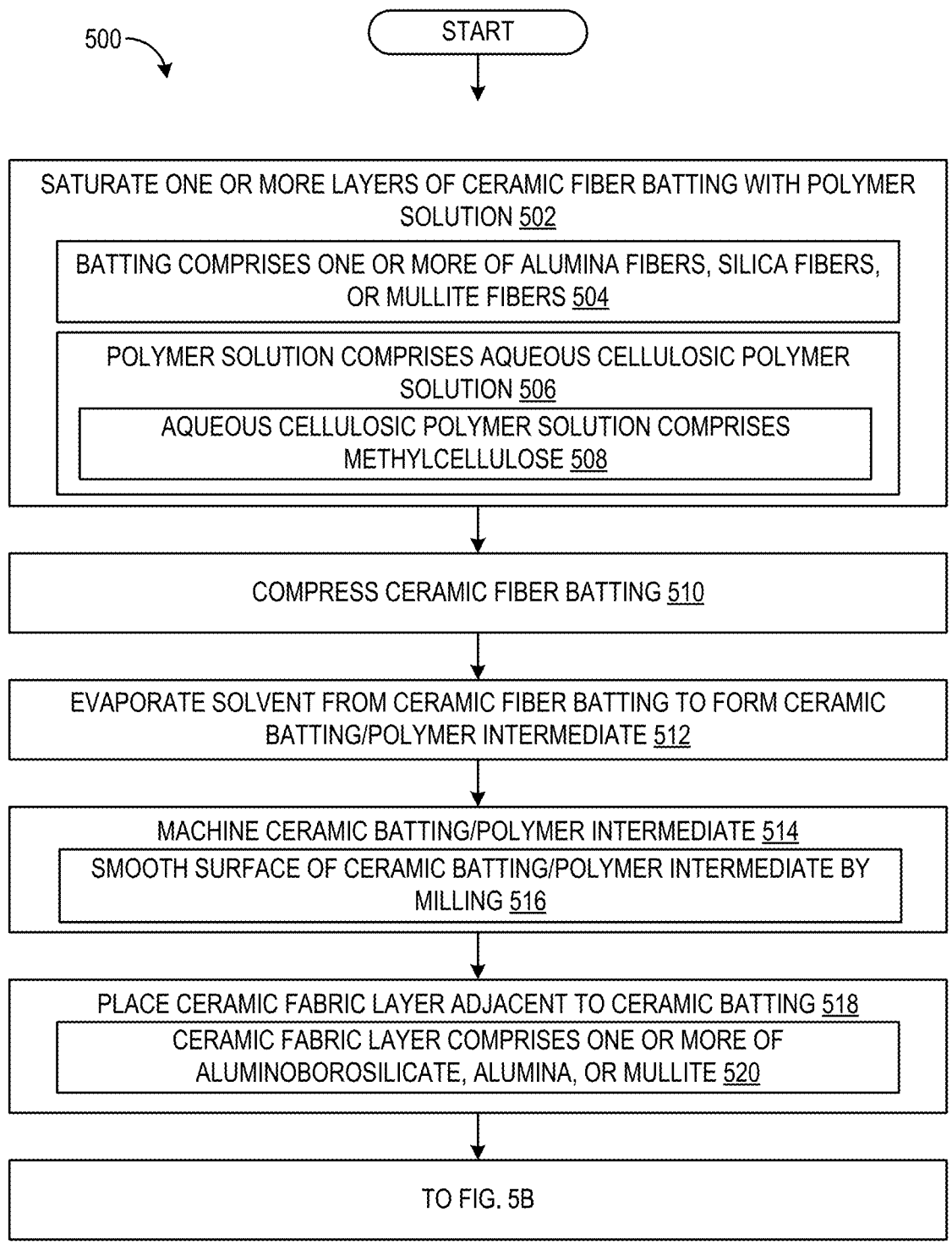
FIGS. 5A-5B show a block diagram illustrating an example method of manufacturing the transpirational cooling panel of FIG. 1.
Figure 5B:
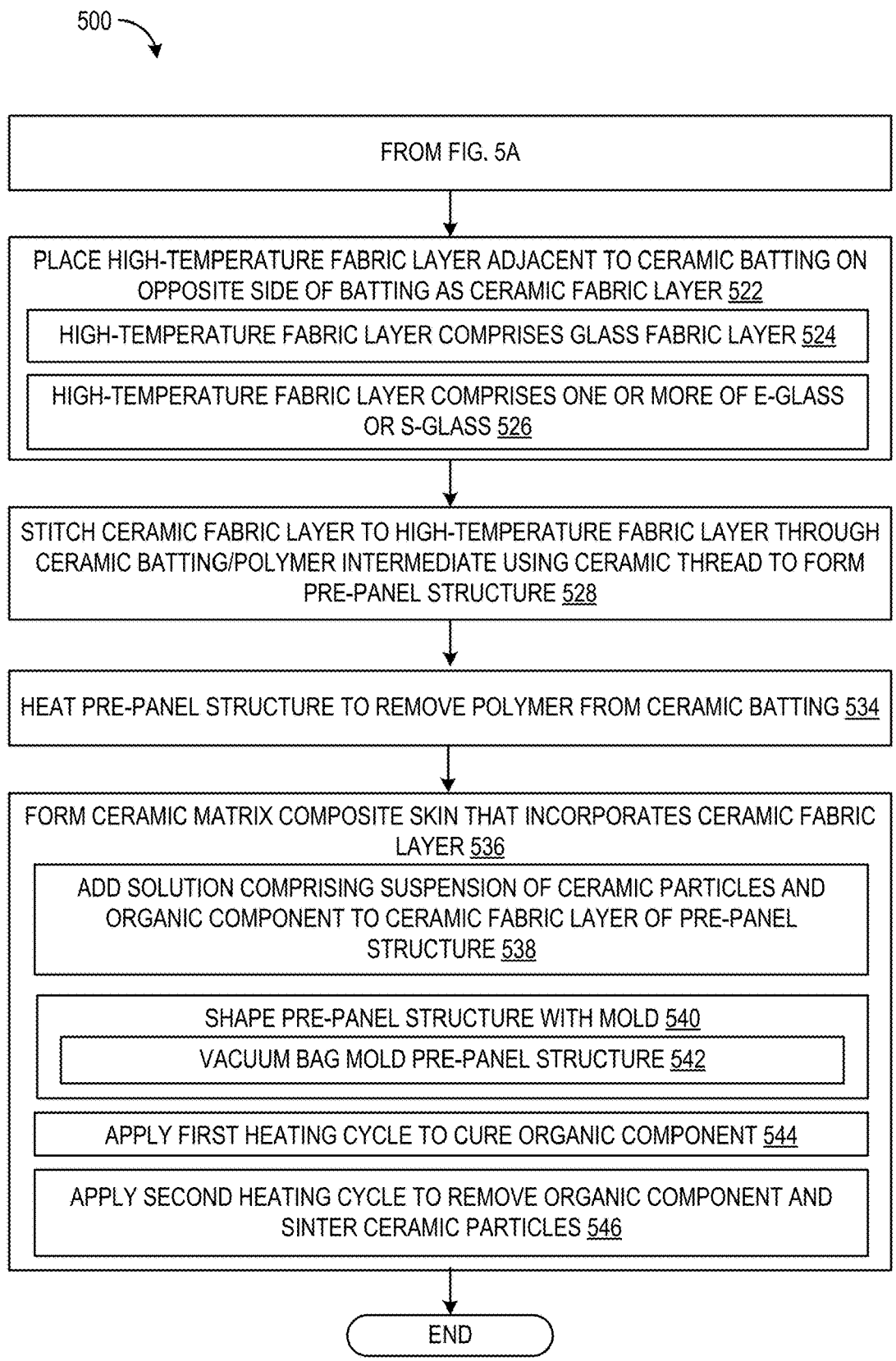

With reference now to FIGS. 5A and 5B, a flow diagram is provided depicting an example method 500 for manufacturing a transpirational cooling panel. The following description of method 500 is provided with reference to the components described herein and shown in FIGS. 1-4 and 6-13. In other examples, the method 500 is performed in other contexts using other suitable components.

Figure 6:
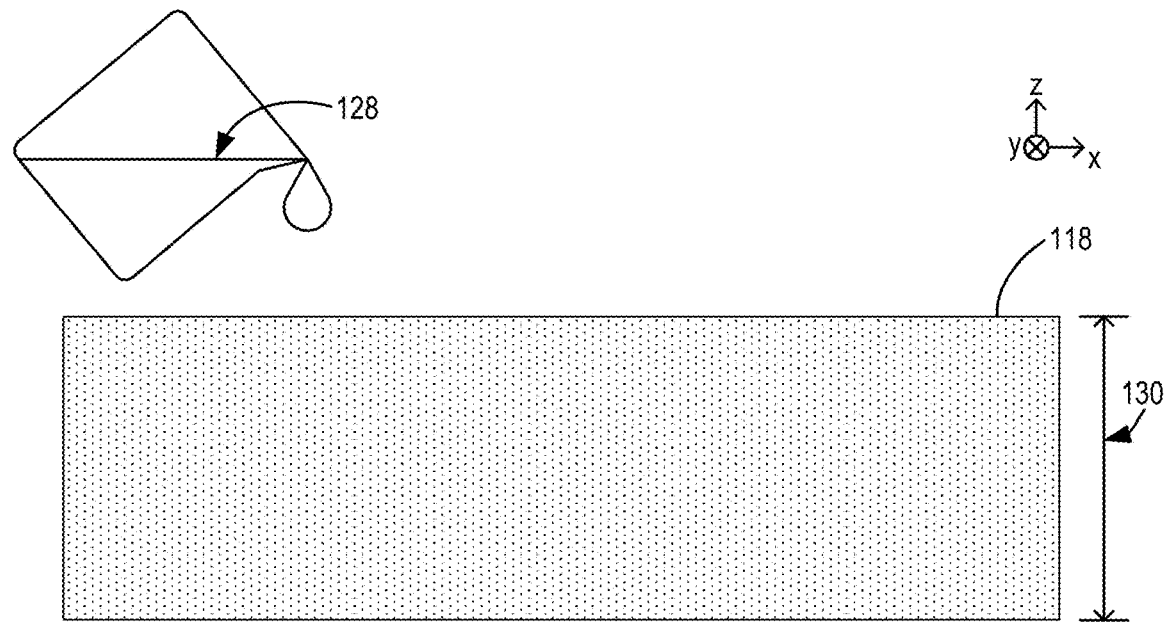
FIG. 6 shows an example of saturating one or more layers of a ceramic fiber batting with a polymer solution during a process of forming the transpirational cooling panel of FIG. 1.
Figure 7:
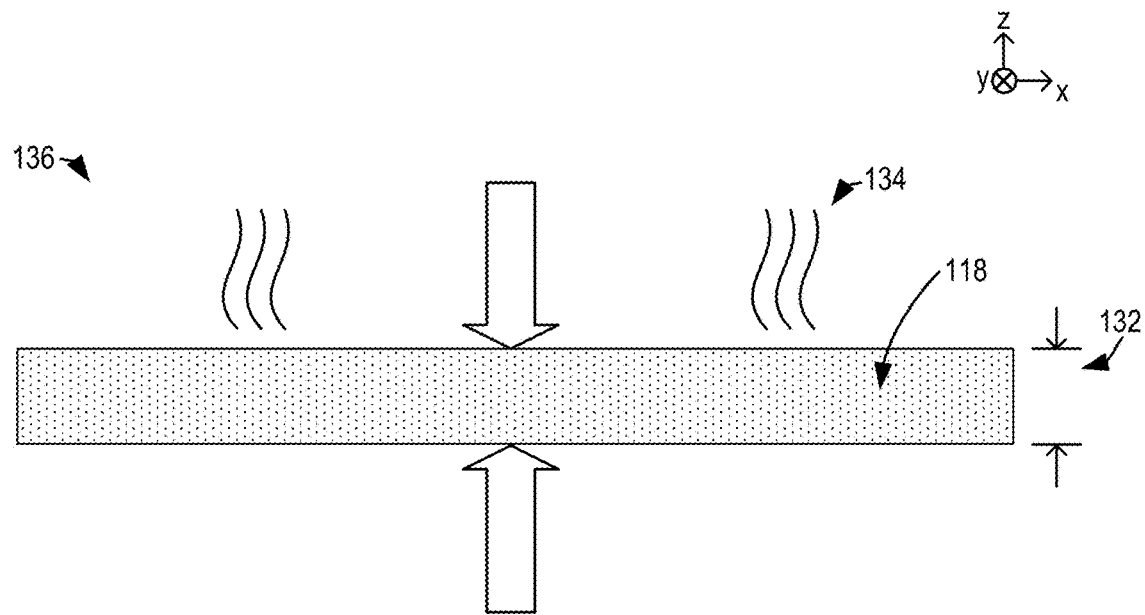
FIG. 7 shows an example of compressing the ceramic fiber batting of FIG. 6 and evaporating solvent from the ceramic fiber batting to form a ceramic batting/polymer intermediate.

With reference first to FIG. 5A, at 502, the method 500 comprises saturating one or more layers of a precursor ceramic fiber batting with a polymer solution. For example, FIG. 6 shows a precursor ceramic fiber batting material 184 that forms the machined ceramic fiber batting material 118 of the transpirational cooling panel 104 depicted in FIG. 3. In some examples, the one or more layers of the precursor ceramic fiber batting material comprise 9 layers of 6"×6"×2" layers of SAFFIL provided by UNIFRAX of Tonawanda, New York. The precursor ceramic fiber batting material 184 is an insulating material that enables the machined ceramic fiber batting material 118 (which is a result of processing the precursor ceramic fiber batting material 184) to thermally isolate the porous CMC layer 114 from the remainder of the transpirational cooling panel 104. In addition, the precursor ceramic fiber batting material 184 has a permeable structure with ample surface area that enables transpirational cooling.

The precursor ceramic fiber batting material 184 that forms the machined ceramic fiber batting 118 comprises any suitable material. In some examples, as indicated at 504, the precursor ceramic fiber batting material comprises one or more of alumina fibers, silica fibers, or mullite fibers. Accordingly, the precursor ceramic fiber batting material enables the machined ceramic fiber batting material 118 to insulate the porous CMC layer 114 from the remainder of the transpirational cooling panel 104, while maintaining a porous, air-permeable structure that enables transpirational cooling at high temperatures (e.g., up to 3000° F.).

In some examples, the precursor ceramic fiber batting material 184 comprises $Al_2O_3$ fiber (e.g., 3 μm diameter fiber) batting provided in a continuous fiber mat having a width of approximately 3 feet and a thickness in the range of 0.25-1 inch. As described in more detail below, the precursor ceramic fiber batting material 184 is stacked in layers that when finally formed into the machined ceramic fiber batting 118 will be about half as thick. In other examples, the ceramic fabric material may have any other suitable dimensions. In some examples, the precursor ceramic fiber batting material 184 is provided in panels having a length and width in the range of 1-100 feet and a thickness in the range of 0.25-12 inches. In other examples, the precursor ceramic fiber batting material 184 is provided in panels having a length and width of 3 feet and a thickness in the range of 0.25-1 inch. In yet other examples, the precursor ceramic fiber batting material 184 is provided in a continuous fiber mat having a width in the range of 1-100 feet and a thickness in the range of 0.25-12 inches. In yet other examples, the precursor ceramic fiber batting material 184 is provided in a continuous fiber mat having a width in the range of 1-10 feet and a thickness in the range of 0.25-9 inches.

As depicted in FIG. 6, the precursor ceramic fiber batting material 184 is saturated with polymer solution 128. The polymer solution 128 comprises any suitable polymer or polymer precursor material suspended or dissolved in any suitable solvent. In some examples, as indicated at 506, the polymer solution 128 comprises an aqueous cellulosic polymer solution. For example, as indicated at 508, in some examples the aqueous cellulosic polymer solution comprises methylcellulose. In other examples, any other suitable cellulosic material can be used. Some examples of suitable cellulosic materials include METHOCEL A15LV, A, E, F, J, K, HB, 228, 240, and 856, each provided by DuPont de Nemours, Inc. of Wilmington, Delaware. Each variant of the METHOCEL has a range of viscosities and gel points in the range of 118-160° F. which varies due to an amount of hydroxypropyl and hydroxybutyl functional groups added to the methylcellulose. In one potential advantage of the present disclosure, the aqueous cellulosic polymer solution is environmentally friendly and non-toxic. In addition, the cellulosic polymer (e.g., methylcellulose) provides sufficient strength to provide rigidity to the precursor ceramic fiber batting material at least temporarily, enabling the precursor ceramic fiber batting material to be machined. Furthermore, the cellulosic polymer decomposes into $CO_2$ and $H_2O$ without leaving behind excessive amounts of combustion residue such as soot and ash, allowing the cellulosic polymer to be easily removed after machining and stitching the precursor ceramic fiber batting material. In some examples, the polymer solution 128 comprises an aqueous solution of cellulosic material at a concentration in the range of 0-5 wt %. In other examples, the solution comprises 2-3 wt % cellulosic material. The concentration of the solution provides a suitable viscosity for handling in the liquid phase as well as for binding the ceramic fibers after gelation. For example, the viscosity of the solution may allow the cellulosic material to easily wet and saturate the ceramic fiber batting material 184 before heating and gelling, then binding the ceramic fiber batting material 184 together. Furthermore, and as described in more detail below, the concentration of the polymer solution 128 enables the ceramic fiber batting material 184 saturated with the polymer solution 128 to be handled and machined, while also allowing the material to be stitched, as described in more detail below. In some examples, the solution has a viscosity in the range of 10-20 cP at 68° F. In other examples the solution has a viscosity in the range of 12-18 cP at 68° F. For example, a 2 wt % solution of METHOCEL A15LV has a viscosity of 15 cP at 68° F. Viscosity may be determined using a viscometer provided by AMETEK BROOKFIELD INC. of Middleboro, Massachusetts. Another potential advantage of the present disclosure, cellulosic material provided at concentrations at or below 5 wt % decomposes during combustion without leaving behind excessive amounts of combustion residue.

The METHOCEL is added to a small amount of water (e.g., ⅓ to ⅕ of a final solution volume) in powder form at 190° F. The METHOCEL powder is dispersed in the water prior to dissolution. This hot METHOCEL mixture is then added to the remaining volume of water at ice cold temperature (e.g., approximately 35° F.) with continuous stirring, and the METHOCEL dissolves and thickens the solution. Layers of the precursor ceramic fiber batting material 184 are submerged in the solution to ensure that the layers are fully saturated. In some examples, one to nine layers of the precursor ceramic fiber batting material 184 are submerged in 500 mL of the solution at a time to ensure that the layers are fully saturated.

With reference again to FIG. 5A, the method 500 further comprises, at 510, compressing the precursor ceramic fiber batting material comprising the polymer solution. In FIG. 6, the precursor ceramic fiber batting material 184 has a first thickness 130 before compression. The precursor ceramic fiber batting material 184 is compressed to a second thickness 132 in FIG. 7, which is less than the first thickness 130. In some examples, the precursor ceramic fiber batting material 184 comprises nine, 2 inch-thick layers saturated with the polymer solution 128, and the first thickness 130 is approximately 18 inches. In other examples, each layer has a thickness of less than 2 inches. These layers are compressed to a second thickness 132 of 2 inches. Excess solution is drained off as the batting is compressed. As described in more detail below, compressing the precursor ceramic fiber batting material 184 and removing solvent (e.g., drying the batting material to remove water) makes the precursor ceramic fiber batting material 184 rigid and enables machining of the precursor ceramic fiber batting material 184. Further, in some examples, a regulated amount of compression is applied to control density and permeability of the precursor ceramic fiber batting material 184.

As indicated at 512 of FIG. 5A, the method 500 further comprises evaporating water from the precursor ceramic fiber batting material 184 to form a ceramic batting/polymer intermediate. In some examples, heat is applied while compressing the precursor ceramic fiber batting material 184 of FIG. 7 to cause evaporation of the water, as indicated at 134. In some examples, the precursor ceramic fiber batting material 184 is heated to a temperature in the range of 100-350° F. In other examples, the precursor ceramic fiber batting material 184 is heated to a temperature in the range of 118-160° F. In yet other examples, the precursor ceramic fiber batting material 184 is heated to a first temperature in the range of 100-160° F. to induce gelation of the polymer solution 128 and then the temperature is ramped up to a second temperature of greater than 190° F. to evaporate the water. In some examples, the precursor ceramic fiber batting material 184 is heated for up to 3 hours. In contrast to other binder solutions (e.g., starch) which decrease in viscosity upon heating, cellulosic materials (e.g., methylcellulose) instead are unique and form a gel structure that increases the viscosity of the polymer solution 128 during the evaporation step 512. Additional aspects of the behavior of an example solution are described in more detail below with reference to FIG. 14. Accordingly, and in one potential advantage of the present disclosure, the solution can be provided at a sufficiently low viscosity (e.g., 10-20 cP in some examples) to saturate the precursor ceramic fiber batting material 184, but forms a gel structure before evaporation of the water. The gel structure prevents the binder from migrating to the surface of the batting, thereby maintaining a homogenous distribution of the binder within the batting.

Heating to a temperature of up to approximately 350° F. removes water that remains in the binder after compression. Removal of the water leaves behind a ceramic batting/polymer intermediate 136 comprising fibers of the ceramic fiber batting material 184 bound in a matrix formed by the polymer material (e.g., methylcellulose). Advantageously, the ceramic batting/polymer intermediate 136 is more rigid than the ceramic fiber batting material 184 alone, facilitating machining and stitching of the ceramic batting/polymer intermediate 136.

Figure 8:
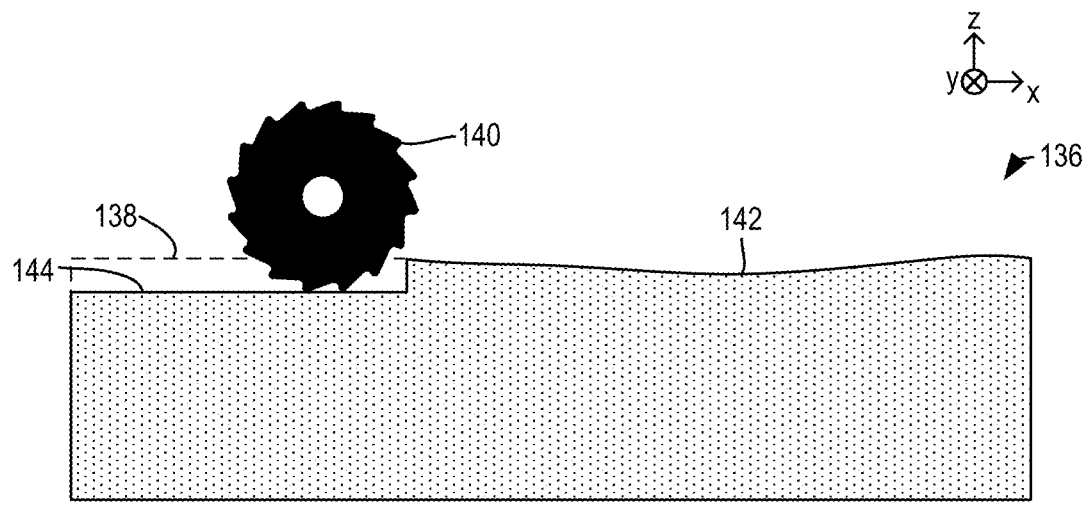
FIG. 8 shows an example of machining the ceramic batting/polymer intermediate of FIG. 7.
Figure 9:
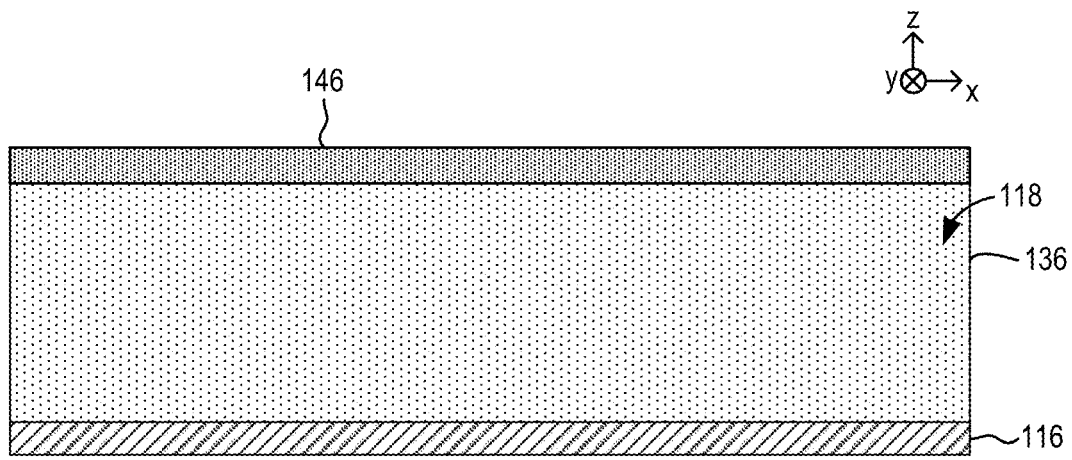
FIG. 9 shows an example of a ceramic fabric layer and a high-temperature fabric layer placed adjacent to the machined ceramic batting/polymer intermediate of FIG. 8.

At 514 of FIG. 5A, the method 500 comprises machining the ceramic batting/polymer intermediate. As depicted in FIG. 8, in some examples, at least a portion 138 of the ceramic batting/polymer intermediate 136 is removed by a tool 140 to machine the ceramic batting/polymer intermediate 136 to a desired shape and/or to provide desired surface characteristics.

In some examples, as indicated at 516 of FIG. 5A, machining the ceramic batting/polymer intermediate comprises smoothing a surface of the ceramic batting/polymer intermediate by milling. For example, because the precursor ceramic fiber batting material 184 is compressible, in some examples, the precursor ceramic fiber batting material 184 comprises a lumpy or undulating original surface 142. Removal of at least the portion 138 of the precursor ceramic fiber batting material 184 from the ceramic batting/polymer intermediate 136 leaves behind a machined outer surface 144 that is more planar than the original surface 142.

In other examples, the surface and/or edges of the ceramic batting/polymer intermediate 136 are machined with any other suitable geometry. In some examples, one or more edges of the ceramic batting/polymer intermediate 136 are cut using a circular saw to form square edges. The square edges enable alignment of two or more insulation or cooling panels (e.g., in the planar mosaic array 112 of FIG. 1). In other examples, one or more beveled edges and/or other features (e.g., a tongue or a groove) are formed in the ceramic batting/polymer intermediate 136 to facilitate mating of two or more transpirational cooling panels without a gap between. In yet other examples, the ceramic batting/polymer intermediate 136 is formed into a suitable shape for use in other applications than a transpirational cooling panel, such as blanket insulation or thermal seals. For example, a thermal seal can be formed with a square, rectangular, oval, or multi-bulb shaped geometry. Furthermore, the ceramic batting/polymer intermediate is machined to precise dimensions (e.g., within a tolerance of 1 mm). In this manner, the ceramic batting/polymer intermediate 136 is formed to a desired shape and/or with desired surface characteristics.

The method 500 further comprises, at 518, placing a ceramic fabric layer adjacent to the machined ceramic fiber batting. For example, with reference to FIG. 9, a ceramic fabric layer 146 is placed adjacent to the ceramic batting/polymer intermediate 136. As described in more detail below, the ceramic fabric layer 146 is a precursor to the porous CMC layer 114.

The ceramic fabric layer 146 comprises any suitable material. In some examples, as indicated at 520 of FIG. 5A, the ceramic fabric layer comprises one or more of aluminoborosilicate, alumina, or mullite. In other examples, the ceramic fabric layer comprises NEXTEL 440, NEXTEL 720, and/or NEXTEL 610, each of which are available from 3M COMPANY of St. Paul, Minnesota. As introduced above, the ceramic fabric layer 146 forms a portion of the porous CMC layer 114 (e.g., skin) of the transpirational cooling panel 104 of FIG. 1, which is exposed to high temperatures (e.g., up to 3000° F.) during operational use. Accordingly, the material selected for the ceramic fabric layer 146 enables the porous CMC layer 114 (e.g., skin) to withstand such temperatures.

With reference now to FIG. 5B, at 522, the method 500 further comprises placing a porous high-temperature fabric layer 116 adjacent to the machined ceramic fiber batting 118 on an opposite side of the machined ceramic fiber batting as the ceramic fabric layer. For example, with reference to FIG. 9, the porous high-temperature fabric layer 116 is placed adjacent to the ceramic batting/polymer intermediate 136.

The porous high-temperature fabric layer 116 comprises any suitable material. Some examples of suitable materials include, but are not limited to, aluminum oxide and silicon dioxide. In some examples, as indicated at 524, the porous high-temperature fabric layer 116 comprises a glass fabric layer. The glass fabric layer comprises any suitable glass material. As indicated at 526, in some examples, the porous high-temperature fabric layer comprises one or more of E-glass or S-glass (e.g., S2 glass). In some examples, the porous high-temperature fabric layer 116 has a thickness in the range of 0.001-0.05 inch. In some examples, the porous high-temperature fabric layer 116 comprises a single-ply glass fabric layer having a thickness of 0.009 inch. The thickness and composition of the porous high-temperature fabric layer 116 enables the porous high-temperature fabric layer 116 to withstand high temperatures, such as the temperatures of engine bypass air (e.g., 300-650° F.). In some examples, thermal performance may be a function of a thickness of the porous high-temperature fabric layer 116.

With reference again to FIG. 5B, the method 500 further comprises, at 528, stitching the ceramic fabric layer 146 to the porous high-temperature fabric layer 116 through the ceramic batting/polymer intermediate 136 using a ceramic thread (e.g., NEXTEL 440) to form a pre-panel structure 150. In some examples, the sides of the pre-panel structure 150 are sewn closed. The ceramic stitching 122 joins the layers of the pre-panel structure 150 while providing tolerance for shaping the pre-panel structure 150 and preventing delamination of the resulting transpirational cooling panel 104 due to thermal expansion/contraction. Advantageously, the rigidity of the ceramic batting/polymer intermediate 136 enables the stitching to loop around at least a portion of a top surface 152 of the pre-panel structure (including at least a portion of the machined outer surface 144 of the machined ceramic fiber batting) without puckering or otherwise distorting the top surface 152, resulting in a relatively flat and even surface compared to the use of a non-rigidized batting.

The ceramic stitching 122 comprises any suitable material. In some examples, the ceramic stitching 122 comprises aluminosilicate fibers. One example of a suitable stitching material includes, but is not limited to, BT-30 thread available from 3M COMPANY of St. Paul, Minnesota, which comprises a NEXTEL 440 fiber wrapped with rayon and coated with TEFLON provided by The Chemours Company of Wilmington, Delaware. The ceramic stitching 122 additionally or alternatively includes ceramic oxide stitching. In this manner, the ceramic stitching 122 is configured to withstand high temperatures and temperature gradients. In addition, and in another potential advantage of the present disclosure, the polymer component of the ceramic batting/polymer intermediate 136 (e.g., methylcellulose) serves as a lubricant in some examples to further prevent pillowing and additionally prevent damage to the ceramic thread and the fibers of the machined ceramic fiber batting 118 during stitching.

Any suitable number of stitches, having any suitable distribution, are used to secure the layers of the pre-panel structure 150. As described in more detail below, the stitch density can be varied to control stiffness and strength of the pre-panel structure 150, and thus the resulting cooling panel.

Figure 10:
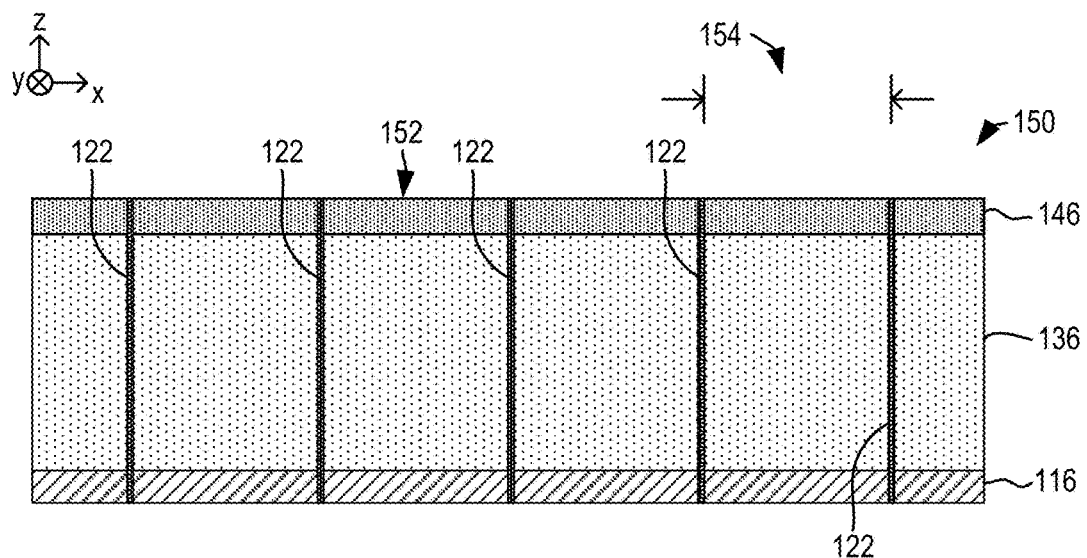
FIG. 10 shows an example of stitching the ceramic fabric layer of FIG. 9 to the high-temperature fabric layer through the ceramic batting/polymer intermediate using a ceramic thread to form a pre-panel structure.
Figure 11:
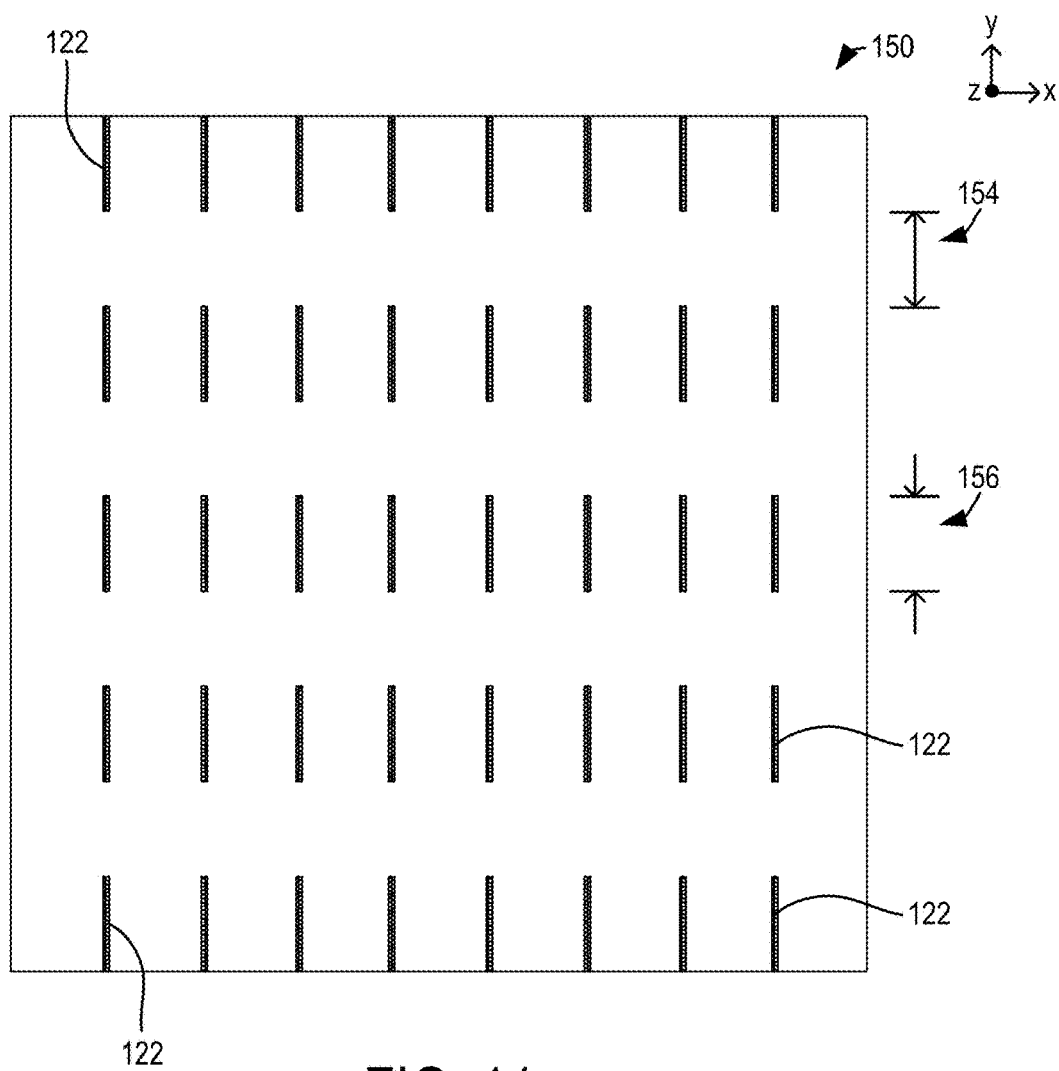
FIG. 11 shows a top view of the pre-panel structure of FIG. 10.

In some examples, the ceramic stitching 122 comprises a stitch density of between one stitch per inch and five stitches per inch along at least one direction (e.g., the x-axis and/or the y-axis direction). In the example depicted in FIG. 10, the stitches are evenly distributed at equal distances 154 (e.g., 1 inch) along the x-axis. FIG. 11 shows a top-down view of the pre-panel structure 150 of FIG. 10. As shown in FIG. 11, each stitch also has an even length 156 (e.g., 1 inch). The even distribution of the ceramic stitching 122 helps to distribute mechanical loads during operation.

In other examples, the distance 154 between stitches and/or the length 156 of each stitch is less than one inch. For example, in some embodiments, the distance 154 and the length 156 are each 0.5 inch. In other examples, the distance 154 and/or the length 156 are 0.25 inch. Stitch density is proportional to aggregate strength of the coupling between the layers of the pre-panel structure 150. The strength of the coupling between the layers of the pre-panel structure is measured in some examples by using an adhesive to bond metal blocks to a top and bottom fabric surface, and then pulling the blocks apart in flatwise tension. The strength is related to the number of through thickness threads per given area. Thus, halving the distance 154 and the length 156, and increasing the number of stitches accordingly, doubles the strength of the pre-panel structure 150 and the resulting transpirational cooling panel and increases the stiffness of the structure. Advantageously, the stitch density imparts strength and stiffness to the transpirational cooling panel that enables the transpirational cooling panel to withstand pressure from cooling air impacting the transpirational cooling panel without deforming.

With reference again to FIG. 5B, at 534, the method 500 comprises heating the pre-panel structure to remove the polymer from within the machined ceramic fiber batting. In some examples, the pre-panel structure 150 of FIGS. 10-11 is heated to 1000° F. In other examples, the pre-panel structure 150 is heated to any other suitable temperature. Other examples of suitable temperatures can include temperatures in the range of 400-1500° F. In some examples, the density of the pre-panel structure 150 is approximately 8 pounds/ft³. Heating to remove the polymer from within the machined ceramic fiber batting reduces the density to 6-7 pounds/ft³. Organic compounds such as methylcellulose and fiber coatings (e.g. a coating of the ceramic thread and/or a coating of the batting fibers are oxidized and thereby removed from the pre-panel structure 150. Removing the polymer matrix releases the batting fibers and restores at least some flexibility or compliance to the machined ceramic fiber batting 118, which is desirable for application in transpiration cooled insulation, conformal reusable insulation, and/or thermal seals. However, the ceramic stitching 122 maintains a shape of the pre-panel structure 150.

At 536, the method 500 comprises forming a CMC skin that incorporates the ceramic fabric layer. For example, the porous CMC layer 114 of FIG. 3 includes the ceramic fabric layer 146 of FIGS. 9-10 within a matrix of ceramic material. In this manner, the ceramic fabric layer 146 serves as a foundation for the porous CMC layer 114 (e.g., skin).

Figure 12:
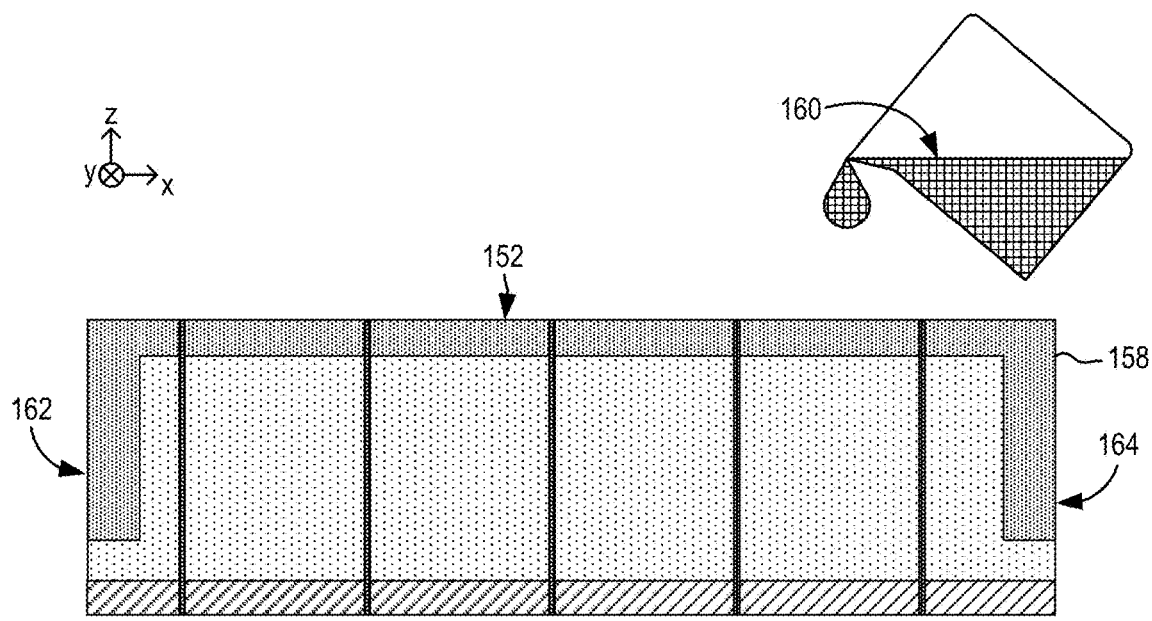
FIG. 12 shows an example of applying a liquid comprising ceramic particles to the pre-panel structure of FIG. 10 for forming a ceramic matrix composite (CMC) skin.
Figure 13:
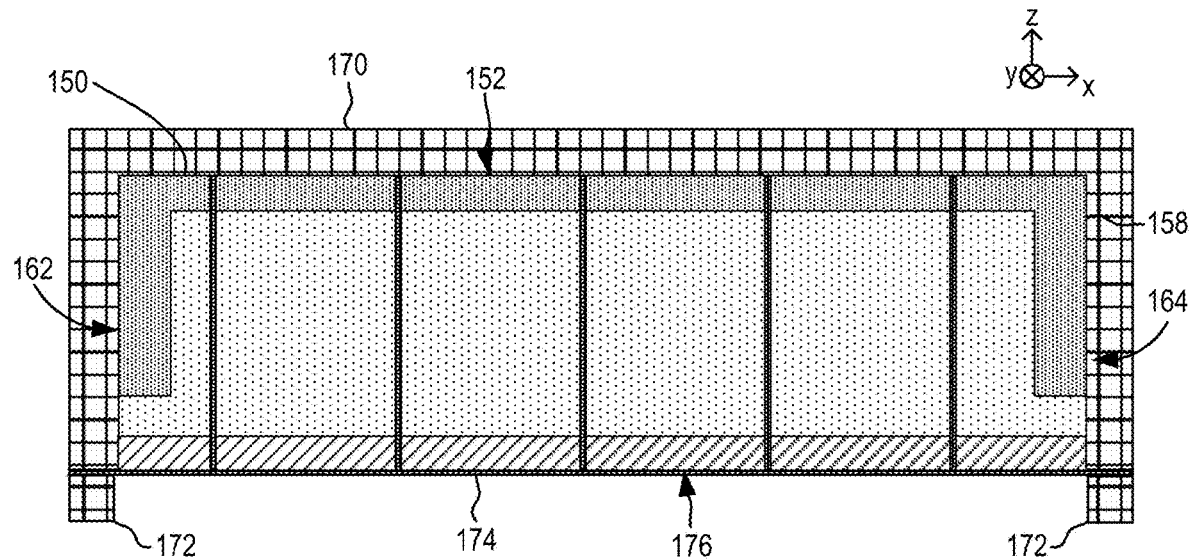
FIG. 13 shows an example of shaping the pre-panel structure of FIG. 10 with a mold.

In some examples, as indicated at 538 of FIG. 5B, forming the CMC skin comprises adding a solution comprising a suspension of ceramic particles and an organic component to the ceramic fabric layer 146 of the pre-panel structure. In some examples, an average diameter of ceramic particles in the suspension is less than 1 μm. The diameter of the ceramic particles prevents these particles from being filtered out by the ceramic fabric layer 146 (which may comprise 12-μm-diameter fibers). The particle size is measured in some examples in accordance with ASTM standard B761-17. In some examples, the particle size is measured using a SEDIGRAPH X-ray particle size analyzer provided by Micrometrics Instrument Corporation of Norcross, Georgia, a Coulter counter, or via laser diffraction. With reference now to FIG. 12, a precursor CMC skin 158 is formed by adding a liquid 160 comprising the ceramic particles and the organic component (e.g., a solution and/or suspension) to the ceramic fabric layer 146 of the pre-panel structure 150 of FIG. 10. The organic component cures and hardens to form a matrix that incorporates the ceramic fabric layer 146 and at least partially surrounds the ceramic fabric layer 146 with the ceramic particles.

It will be appreciated that the liquid 160 comprises any suitable ceramic particles and any suitable organic component. In some examples, the organic component comprises an epoxy. The epoxy is readily applied to the pre-panel structure 150 as a liquid that cures and hardens to form the matrix of the precursor CMC skin 158. Further, mechanical properties of the precursor CMC skin 158 can be tuned by controlling crosslinking of the epoxy.

The suspended ceramic particles comprise any suitable ceramic material. Some examples of suitable materials include, but are not limited to, alumina, silica, silicon carbide, or combinations thereof. In some examples, silicon carbide is utilized alone, or in combination with another material, as an emissivity agent. The emissivity of the transpirational cooling panel 104 is in the range of 0.5 to 1.0, where 1.0 is high emissivity close to a black body. In other examples, the emissivity of the transpirational cooling panel 104 is in the range of 0.75-0.9. In yet other examples, the emissivity of the transpirational cooling panel 104 is 0.85. Accordingly, and in one potential advantage of the present disclosure, the surface of the transpirational cooling panel has high emissivity when heated, and will absorb and re-reflect heat quickly. As a result, the surface is cooled on the order of hundreds of degrees during operational use.

The liquid 160 comprises any suitable solvent. Some examples of suitable solvents include, but are not limited to, water, alcohols (e.g., 2-isopropanol) and acetone. The solvent is configured to provide a suitable amount of working time (e.g., on the order of minutes or hours) to apply the liquid 160 to the pre-panel structure 150 without the ceramic particles and the organic component drying out.

In some examples, the liquid 160 is configured to penetrate the ceramic fabric layer 146 without saturating the machined ceramic fiber batting 118. Accordingly, and in another potential advantage of the present disclosure, the pre-panel structure 150 does not include an additional film to prevent the liquid from saturating the machined ceramic fiber batting in some examples.

With continued reference to FIG. 12, in some examples, the ceramic fabric layer 146 and/or the liquid 160 are provided on the top surface 152 of the pre-panel structure 150 and along at least a portion of one or more lateral sides 162, 164 of the pre-panel structure 150. In this manner, the porous CMC layer 114, which results from processing the precursor CMC skin 158 and liquid added at 538 (as described below), extends along at least the portion of the one or more lateral sides 162, 164 of the transpirational cooling panel 104. In some examples, the porous CMC layer 114 extends 0.75 inches in the negative z-axis direction from the top surface 152 of a one-inch thick transpirational cooling panel 104. In other examples, the porous CMC layer 114 extends down 25-100% of the one or more lateral sides 162, 164. Accordingly, and in one potential advantage of the present disclosure, extending the porous CMC layer 114 along at least a portion of the one or more lateral sides 162, 164 prevents deflection of the transpirational cooling panel 104 out of a plane formed by top surface 152, and contains lateral expansion of the transpirational cooling panel 104. In addition, the extension of the porous CMC layer 114 helps to contain pressurization resulting from cooling air 166 entering the transpirational cooling panel 104, enabling efficient use of the cooling air 166 for transpirational cooling.

In some examples, at least a portion of the transpirational cooling panel 104 is not coated by the porous CMC layer 114. For example, the bottom 0.25 inch of the transpirational cooling panel 104 (adjacent to the porous high-temperature fabric layer 116) is uncoated. In other examples, 25-100% of the one or more lateral sides 162, 164 of the transpirational cooling panel 104 is uncoated. Advantageously, the uncoated portion of the structure provides compliance and acoustic dampening that prevents damage or deformation of the coated surfaces under applied forces.

As introduced above, the transpirational cooling panel 104 experiences large temperature gradients during operational use. For example, in some implementations, the porous CMC layer 114 is subjected to temperatures up to 3000° F. while the porous high-temperature fabric layer 116 is subjected to temperatures in the range of 400-600° F. Such temperature gradients, and in some instances different coefficients of thermal expansion between the porous CMC layer 114, the porous high-temperature fabric layer 116, and the machined ceramic fiber batting 118, give rise to differential amounts of thermal expansion 124 (e.g., expansion outwards from a center of the transpirational cooling panel 104 in the positive and negative x-axis directions) at different locations along the z-axis, as depicted in FIG. 4. In another potential advantage of the present disclosure, the uncoated portion of the transpirational cooling panel provides compliance that relieves internal stresses that potentially arise in response to differential thermal expansion 124.

With continued reference to FIG. 3, in some examples, the porous CMC layer 114 has a thickness 168 in the range of 0.010-0.100 inch. In some examples, the porous CMC layer 114 comprises a single-ply ceramic fabric layer 146 having a thickness of 0.010 inch. Thus, in this example, the porous CMC layer 114 has a thickness of 0.010 inch. In other examples, the ceramic fabric layer 146 comprises three-ply angle-interlock structure, and the resulting porous CMC layer 114 has a thickness of 0.030 inch. The thickness 168 of the porous CMC layer 114 provides a suitable number of weaves in a through-thickness direction of the ceramic fabric layer 146 (e.g., about the z-axis) to prevent the ceramic fiber cloth from unraveling during manufacturing, in addition to maintaining stiffness and providing suitable mechanical strength to contain thermal deformation of the transpirational cooling panel 104.

With reference again to FIG. 5B, in some examples, the method 500 comprises, at 540, shaping the pre-panel structure with a mold after adding the solution to the ceramic fabric layer and before heating. In some examples, as indicated at 542, shaping the pre-panel structure comprises vacuum bag molding the pre-panel structure. For example, and with reference now to FIG. 13, the pre-panel structure 150 is placed in a vacuum molding tool 170. In the example depicted in FIG. 13, the vacuum molding tool 170 conforms to a desired shape of the top surface 152 and the lateral sides 162, 164. A clamp 172 is used to apply a vacuum molding film 174 over a bottom surface 176 of the pre-panel structure 150. A vacuum is drawn between the vacuum molding tool 170 and the vacuum molding film 174 to form the pre-panel structure 150 into a desired shape and to help remove solvent. In the present example, the pre-panel structure 150 is formed in the shape of a rectangular panel. In other examples, the pre-panel structure is formed in any other suitable shape. Another example of a suitable shape includes, but is not limited to, the curved structure of the transpirational cooling panel 202 of FIG. 2.

Continuing in FIG. 5B, in some examples, the method 500 includes applying a first heating cycle to harden the organic component at 544. In some examples, the first heating cycle is applied by heating the pre-panel structure 150 while it is in the vacuum molding tool 170 of FIG. 13. In this manner, the mold shapes the formation of a complementary outer skin surrounding the ceramic fabric layer 146, with ceramic particles distributed around and within the ceramic fabric layer 146. The hardening of the organic component makes the pre-panel structure 150 more rigid.

The pre-panel structure 150 is heated to any suitable temperature for any suitable duration. In some examples, the pre-panel structure 150 is heated to a temperature in the range of 100-400° F. for up to 24 hours. As another example, the pre-panel structure 150 is heated to 350° F. for 1-2 hours. In this manner, the organic component of the precursor CMC skin 158 crosslinks and hardens the precursor CMC skin 158.

With reference again to FIG. 5B, at 546, in some examples, a second heating cycle is applied to remove the organic component and to sinter the ceramic particles. In some examples, the second heating cycle is applied while the pre-panel structure is free-standing (e.g., the structure has been removed from the vacuum molding tool 170). The second heating cycle forms the porous CMC layer 114 (e.g., skin) of FIG. 3, in which the ceramic fabric layer 146 of FIG. 8 and the ceramic particles from the liquid 160 are sintered together into an integral structure. Evacuation of the organic component also introduces pores into the matrix to facilitate transpirational cooling.

In some examples, the pre-panel structure 150 is heated to any suitable temperature for any suitable duration of time. Some examples of suitable temperatures include, but are not limited to, temperatures in the range of 500-3000° F. Some examples of suitable durations are in the range of 30 minutes-24 hours. In other examples, the pre-panel structure 150 is heated to 1000° F. for 2 hours. In this manner, the ceramic fabric layer 146 of FIG. 8 and the ceramic particles are sintered to form the CMC layer 114 without melting the porous high-temperature fabric layer 116 (e.g., high-temperature glass fabric layer).

In addition, the second heating cycle evaporates and/or oxidizes any remaining solvent along with the organic polymer in the precursor CMC skin 158. Accordingly, and in one potential advantage of the present disclosure, the removal of the organic polymer results in pores forming in the porous CMC layer 114. In some examples, the porous CMC layer 114 has a void fraction in the range of 20-95%. In other examples, the porous CMC layer 114 has a void fraction in the range of 25-60%. In yet other examples, the porous CMC layer 114 has a void fraction in the range of 35-50%. The porosity of the porous CMC layer 114 may be measured by dividing a weight of the porous CMC layer 114 by its volume and comparing this to a theoretical density value. The pore size distribution can be measure by mercury porosimetry. This can also be done for the ceramic batting and the CMC skin. Another method for determining the porosity of the porous CMC layer 114 is to evaluate a rate of airflow through each layer for a given pressure, which is related to the porosity and the pore size distribution. In this manner, the porous CMC layer 114 is permeable to airflow, enabling transpirational cooling. In addition, the porosity of the porous CMC layer 114 regulates an amount of pressure maintained within the transpirational cooling panel 104 by the cooling air 166.

With reference again to FIG. 3, in some examples, the transpirational cooling panel 104 is secured to a carrier panel 178. In the example depicted in FIG. 3, the carrier panel 178 is coupled to the porous high-temperature fabric layer 116. As described in more detail below, the carrier panel 178 provides mechanical support and secures the transpirational cooling panel 104 within the aircraft 102 of FIG. 1. In addition, the carrier panel 178 regulates airflow rate, air pressure, and uniformity of the cooling air 166.

The carrier panel 178 is coupled to the transpirational cooling panel 104 in any suitable manner. In some examples, the carrier panel 178 is adhered to the porous high-temperature fabric layer 116 via an adhesive 180. The adhesive 180 comprises any suitable material. One example of a suitable adhesive includes, but is not limited to, RTV-560 provided by MOMENTIVE, Inc. of Waterford, New York. In other examples, the carrier panel 178 is coupled to the transpirational cooling panel 104 via one or more mechanical fasteners. In this manner, the coupling between the carrier panel and the transpirational cooling panel is configured to withstand the temperatures and forces it is subjected to during operational use.

The carrier panel 178 comprises any suitable material. Some examples of suitable materials include, but are not limited to, stainless steel (e.g., 304 stainless steel), aluminum, alloys, titanium and superalloys. In this manner, the carrier panel 178 is configured to withstand the temperatures and pressures of cooling air 166 without deforming or melting.

In addition, the carrier panel 178 includes one or more openings 182 configured to pass cooling air from the cooling air source (e.g. the engine bypass air 120) to the transpirational cooling panel 104. The number of openings 182 and/or a diameter of each opening regulate permeability of the carrier panel 178. Any suitable number of openings can be provided in any suitable distribution, with any suitable diameter. In some examples, 395 circular openings with a diameter in the range of 0.05-0.1 inches are provided in an 18 inches×18 inches carrier panel, distributed such that a center of each circular opening is 0.65 inches from adjacent openings. In other examples, one or more of the openings have a diameter in the range of 0.065-0.070 inches. In this manner, the openings 182 are configured to regulate airflow through the carrier panel 178 and thus control transpirational cooling at the transpirational cooling panel 104.

The following paragraphs describe examples of experiments that were carried out on an example transpirational cooling panel. Survivability testing was performed on the transpirational cooling panel without using cooling air. The transpirational cooling panel was placed behind a T-58 afterburner engine provided by General Electric Company of Boston, Massachusetts. The transpirational cooling panel was tested for 61 afterburner cycles over a total run time of 3 hours and 27 minutes (in which the afterburner was active for 2 hours and 29 minutes, total). During 46 of those cycles, the CMC skin reached a temperature of 1800° F. Uneven surface temperature (between 800-1800° F.) was observed due to engine gas swirling.

In this experiment, the CMC skin was not bonded to the machined ceramic fiber batting. After the afterburner cycle, the free-floating low-mass CMC skin rapidly cooled by 1000° F. in less than 5 seconds. Inspection of the transpirational cooling panel after testing showed no visible degradation or deformation.

To test active cooling, the same panel used in the above-mentioned survivability testing was mounted on a cooling plenum behind the T-58 engine. Pressurized air was fed into the transpirational cooling panel at between 5-15 psi at room temperature prior to the test. The pressure of the pressurized air is measured using a standard pressure gauge (e.g., at an air compressor tank). The T-58 engine was run under the same conditions, with cooling air feeds at ambient temperature, 200° F., and 400° F. in different cycles. In different cycles, the pressure of the cooling air was 2.5 psi, 5 psi, or 7.5 psi, 10 psi, 12 psi and 15 psi. Room temperature air reduced the surface temperature of the transpirational cooling panel by 780° F. while the afterburner was in use.

In addition, infrared imaging of a top surface of the transpirational cooling panel was performed at room temperature while the transpirational cooling panel was fed with air at 400° F. through holes in a carrier plate. The temperature of the top surface was uniform, with air diffusion through the machined ceramic fiber batting and the CMC skin dispersing heat away from the holes in the carrier plate.

Figure 14:
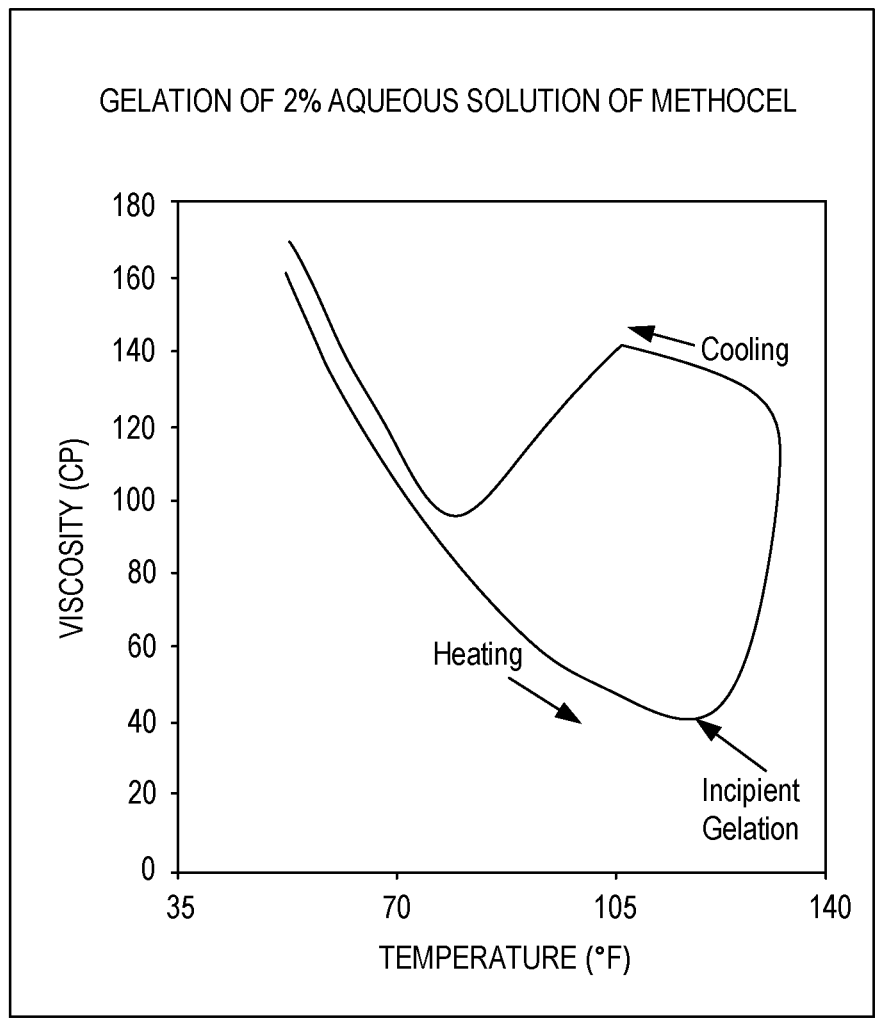
FIG. 14 shows a plot of viscosity for an example solution that can be used to saturate the one or more layers of the ceramic fiber batting of FIG. 6.

FIG. 14 shows a plot of viscosity for an example solution of 2 wt % METHOCEL that can be used to saturate the one or more layers of the precursor ceramic fiber batting 184 of FIG. 6. As introduced above, the solution has a sufficiently low viscosity (e.g., 10-20 cP) to saturate the precursor ceramic fiber batting 184. However, as shown in FIG. 14, the solution becomes a gel when heated (prior to drying). In the example of FIG. 14, the solution was heated at a rate of 0.25° F./min and viscosity was evaluated at a shear rate of 86 sec$^{-1}$. The viscosity rapidly increases at 118° F. as the solution forms a gel, rather than decreasing as is the case for other types of binder materials (e.g., starches). The gelation of the solution prevents the binder from migrating and forming a crust on outer surfaces of the material, and also prevents the precursor ceramic fiber batting 184 from collapsing during evaporation of water.

Further, the disclosure comprises configurations according to the following clauses.

Clause 1. A method of manufacturing a ceramic composite panel, the method comprising
saturating one or more layers of a precursor ceramic fiber batting material with a polymer solution;
compressing the precursor ceramic fiber batting material comprising the polymer solution;
evaporating solvent from the precursor ceramic fiber batting material to form a ceramic batting/polymer intermediate;
machining the ceramic batting/polymer intermediate;
placing a ceramic fabric layer adjacent to the machined ceramic fiber batting/polymer intermediate;
placing a porous high-temperature fabric layer adjacent to the machined ceramic fiber batting/polymer intermediate on an opposite side of the machined ceramic fiber batting/polymer intermediate as the ceramic fabric layer;
stitching the ceramic fabric layer to the porous high-temperature fabric layer through the ceramic batting/polymer intermediate using a ceramic thread to form a pre-panel structure;
heating the pre-panel structure to remove the polymer from within the machined ceramic fiber batting/polymer intermediate; and
forming a ceramic matrix composite skin that incorporates the ceramic fabric layer.

Clause 2. The method of clause 1, wherein the polymer solution comprises an aqueous cellulosic polymer solution.

Clause 3. The method of clause 2, wherein the aqueous cellulosic polymer solution comprises methylcellulose.

Clause 4. The method of clause 1, wherein the ceramic fabric layer comprises one or more of aluminoborosilicate, alumina, or mullite.

Clause 5. The method of clause 1, wherein the porous high-temperature fabric layer comprises a glass fabric layer.

Clause 6. The method of clause 1, wherein the porous high-temperature fabric layer comprises one or more of E-glass or S-glass.

Clause 7. The method of clause 1, wherein forming the ceramic matrix composite skin comprises adding a solution comprising a suspension of ceramic particles and an organic component to the ceramic fabric layer of the pre-panel structure, applying a first heating cycle to cure the organic component, and then applying a second heating cycle to remove the organic component and to sinter the ceramic particles.

Clause 8. The method of clause 7, further comprising shaping the pre-panel structure with a mold after adding the solution to the ceramic fabric layer and before heating.

Clause 9. The method of clause 8, wherein shaping the pre-panel structure with the mold comprises vacuum bag molding the pre-panel structure.

Clause 10. The method of clause 7, wherein the ceramic particles comprise particles of one or more of alumina, silica, or silicon carbide.

Clause 11. The method of clause 1, wherein machining the ceramic batting/polymer intermediate comprises smoothing a surface of the ceramic batting/polymer intermediate by milling.

Clause 12. The method of clause 1, wherein the precursor ceramic fiber batting material comprises one or more of alumina fibers, silica fibers, or mullite fibers.

Clause 13. The method of clause 1, wherein the ceramic composite panel comprises a transpirational cooling panel, an insulation panel, an insulation blanket, or a thermal seal.

Clause 14. An apparatus, comprising:
a cooling system comprising
a transpirational cooling panel comprising
a porous ceramic matrix composite layer;
a porous high-temperature fabric layer adjacent to a cooling air source;
a machined ceramic fiber batting located between the porous ceramic matrix composite layer and the porous high-temperature fabric layer; and
a ceramic oxide stitching joining the porous ceramic matrix composite layer and the porous high-temperature fabric layer through the machined ceramic fiber batting.

Clause 15. The apparatus of clause 14, further comprising a carrier panel coupled to the porous high-temperature fabric layer, the carrier panel comprising one or more openings configured to pass cooling air from the cooling air source to the porous high-temperature fabric layer.

Clause 16. The apparatus of clause 14, wherein the apparatus comprises an aircraft or a spacecraft.

Clause 17. A stitched ceramic batting, comprising:
one or more layers of a ceramic fiber batting comprising a machined outer surface;
a cellulosic matrix that binds fibers of the ceramic fiber batting to provide rigidity to the ceramic fiber batting; and
a ceramic stitching that loops around at least a portion of the machined outer surface of the ceramic fiber batting, wherein a rigidity of the ceramic fiber batting and the cellulosic matrix maintains uniformity of the machined outer surface of the ceramic fiber batting around the ceramic stitching.

Clause 18. The stitched ceramic batting of clause 17, wherein the ceramic stitching joins the one or more layers of the ceramic fiber batting to a ceramic fabric layer adjacent to the uniform machined outer surface and to a high-temperature fabric layer on a side of the ceramic fiber batting opposite the uniform machined outer surface.

Clause 19. The stitched ceramic batting of clause 17, wherein the cellulosic matrix comprises methylcellulose.

Clause 20. The stitched ceramic batting of clause 17, wherein the one or more layers of the ceramic fiber batting further comprise one or more of a machined edge or one or more mating features.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described routines or methods may be changed.

The subject matter of the present disclosure includes all novel and non-obvious combinations and sub-combinations of the various methods, systems and configurations, and other features, functions, acts, and/or properties disclosed herein, as well as any and all equivalents thereof.

Further, it will be appreciated that the terms "includes," "including," "has," "contains," variants thereof, and other similar words used in either the detailed description or the claims are intended to be inclusive in a manner similar to the term "comprising" as an open transition word without precluding any additional or other elements.

The invention claimed is:

1. A method of manufacturing a transpirational cooling panel, the method comprising
saturating one or more layers of a precursor ceramic fiber batting material with a polymer solution;
compressing the precursor ceramic fiber batting material comprising the polymer solution;
evaporating solvent from the precursor ceramic fiber batting material to form a ceramic batting/polymer intermediate;
machining the ceramic batting/polymer intermediate;
placing a ceramic fabric layer adjacent to the machined ceramic batting/polymer intermediate;
placing a porous high-temperature fabric layer adjacent to the machined ceramic batting/polymer intermediate on an opposite side of the machined ceramic batting/polymer intermediate as the ceramic fabric layer;
stitching the ceramic fabric layer to the porous high-temperature fabric layer through the machined ceramic batting/polymer intermediate using a ceramic thread to form a pre-panel structure;
heating the pre-panel structure to remove the polymer from within the machined ceramic batting/polymer intermediate after stitching the pre-panel structure;
forming a ceramic matrix composite skin that incorporates the ceramic fabric layer of the pre-panel structure, by
adding a solution comprising a suspension of ceramic particles and an organic component to the ceramic fabric layer of the pre-panel structure,
applying a first heating cycle to cure the organic component in the ceramic fabric layer, and
applying a second heating cycle to sinter the ceramic particles and to remove the organic component cured thereby forming pores in the ceramic matrix composite skin; and
coupling the porous high-temperature fabric layer to a carrier panel including one or more openings configured to pass cooling air.

2. The method of claim 1, wherein the polymer solution comprises an aqueous cellulosic polymer solution.

3. The method of claim 2, wherein the aqueous cellulosic polymer solution comprises methylcellulose.

4. The method of claim 1, wherein the ceramic fabric layer comprises one or more of aluminoborosilicate, alumina, or mullite.

5. The method of claim 1, wherein the porous high-temperature fabric layer comprises a glass fabric layer.

6. The method of claim 1, wherein the porous high-temperature fabric layer comprises one or more of E-glass or S-glass.

7. The method of claim 1, further comprising shaping the pre-panel structure with a mold after adding the solution to the ceramic fabric layer and before the first heating cycle.

8. The method of claim 7, wherein shaping the pre-panel structure with the mold comprises vacuum bag molding the pre-panel structure.

9. The method of claim 1, wherein the ceramic particles comprise particles of one or more of alumina, silica, or silicon carbide.

10. The method of claim 1, wherein machining the ceramic batting/polymer intermediate comprises smoothing a surface of the ceramic batting/polymer intermediate by milling.

11. The method of claim 1, wherein the precursor ceramic fiber batting material comprises one or more of alumina fibers, silica fibers, or mullite fibers.

12. The method of claim 1, wherein applying the second heating cycle to remove the organic component cured thereby forming the pores in the ceramic matrix composite skin comprises forming the pores with a void fraction in a range of 20-95% of the ceramic matrix composite skin.

13. The method of claim 1, further comprising incorporating the transpirational cooling panel into an exhaust system of an apparatus.

* * * * *